United States Patent
Davies et al.

(10) Patent No.: US 6,304,048 B1
(45) Date of Patent: Oct. 16, 2001

(54) METHOD AND DEVICE FOR DETERMINING TORQUE IN AN AUTOMOTIVE POWER WINDOW SYSTEM

(75) Inventors: Timothy Davies, Hermitage; Charles Hopson, Lebanon, both of TN (US); Joseph Tyckowski, Clawson; Christos Kyrtsos, Southfield, both of MI (US); Francois Breynaert, Caen; Pascal Bonduel, Bouzy La Foret, both of (FR)

(73) Assignee: Meritor Light Vehicle Systems, Inc., Troy, MI (US)

( * ) Notice: Subject to any disclaimer, the term of this patent is extended or adjusted under 35 U.S.C. 154(b) by 0 days.

(21) Appl. No.: 09/390,888

(22) Filed: Sep. 7, 1999

(Under 37 CFR 1.47)

(51) Int. Cl.[7] .................. E05F 15/10; G05B 9/02
(52) U.S. Cl. .............. 318/475; 318/266; 318/286; 318/434; 318/469; 49/26
(58) Field of Search ................. 318/646, 647, 318/648, 652, 256, 264, 265, 266, 283, 286, 432, 434, 466, 468, 469, 474, 475; 49/26

(56) References Cited

U.S. PATENT DOCUMENTS

| | | | |
|---|---|---|---|
| 3,652,911 | * | 3/1972 | Gorissen .................. 318/474 |
| 4,564,265 | * | 1/1986 | Miki . | |
| 5,832,664 | * | 11/1998 | Tajima et al. ................ 49/26 |

* cited by examiner

Primary Examiner—Bentsu Ro
(74) Attorney, Agent, or Firm—Howard & Howard

(57) ABSTRACT

A method and device for determining torque applied to a motor of an automotive power window system includes a motor having a rotor mounted on a rotor shaft wherein the rotor and rotor shaft move linearly along an axial length of the rotor shaft in response to an applied torque. A ring magnet is mounted on the rotor shaft for generating a magnetic field as the rotor shaft rotates. A sensor, in communication with the ring magnet, senses a strength of the magnetic field based on a linear position of the ring magnet in relation to the sensor and generates a proportional voltage signal. A control circuit receives the voltage signal and detects a torque applied to the motor in response thereto.

13 Claims, 2 Drawing Sheets

METHOD AND DEVICE FOR DETERMINING TORQUE IN AN AUTOMOTIVE POWER WINDOW SYSTEM

BACKGROUND OF THE INVENTION

The invention relates to a method and device for determining torque in an automotive power window system for use in detecting an object caught between a window and its respective frame.

Many of the automotive vehicles today have electronically controlled windows and may even have electronically controlled sun/moon roofs. These systems provide the operator with ease in opening and closing the windows. However, if the operator is distracted while closing the window, it is possible for an object, such as an am, hand or finger, to be caught between the window and the header, or seal, of the automotive window.

Techniques exist today to measure torque of a motor associated with a power window system. By monitoring motor torque, a prediction can be made that an obstruction is in the way of the vehicle window. However, these techniques are typically costly due to the added components necessary to detect the torque. Furthermore, the torque-sensing components typically come into contact with the motor resulting in a reliability concern. Thus, there exists a need for a reliable, yet inexpensive method and device for detecting torque applied to a motor of an automotive power window system.

SUMMARY OF THE INVENTION

A torque applied to a motor of an automotive power window system is detected by securing a ring magnet to a rotor shaft of the motor for generating a magnetic field in response to the rotation of the rotor shaft. The rotor, as well as the rotor shaft, moves linearly along an axial length of the rotor shaft in response to an applied torque. The strength of the magnetic field is sensed by a Hall Effect sensor based on the linear position of the rotor shaft. A control circuit receives a voltage signal from the sensor and detects the torque based on the strength of the magnetic field. The control circuit then controls the motor to either stop or reverse its direction.

In a preferred embodiment, a direction of the torque is determined based on the strength of the magnetic field and the linear position of the rotor shaft. This is accomplished by positioning the ring magnet at an end of the sensor rather than at a middle position during a steady-state mode. Thus, the strength of the magnetic field varies asymmetrical with respect to the direction of displacement with respect the steady state position.

These and other features of the present invention can be understood from the following specification and drawings.

DETAILED DESCRIPTION OF A PREFERRED EMBODIMENT

Figure 1:
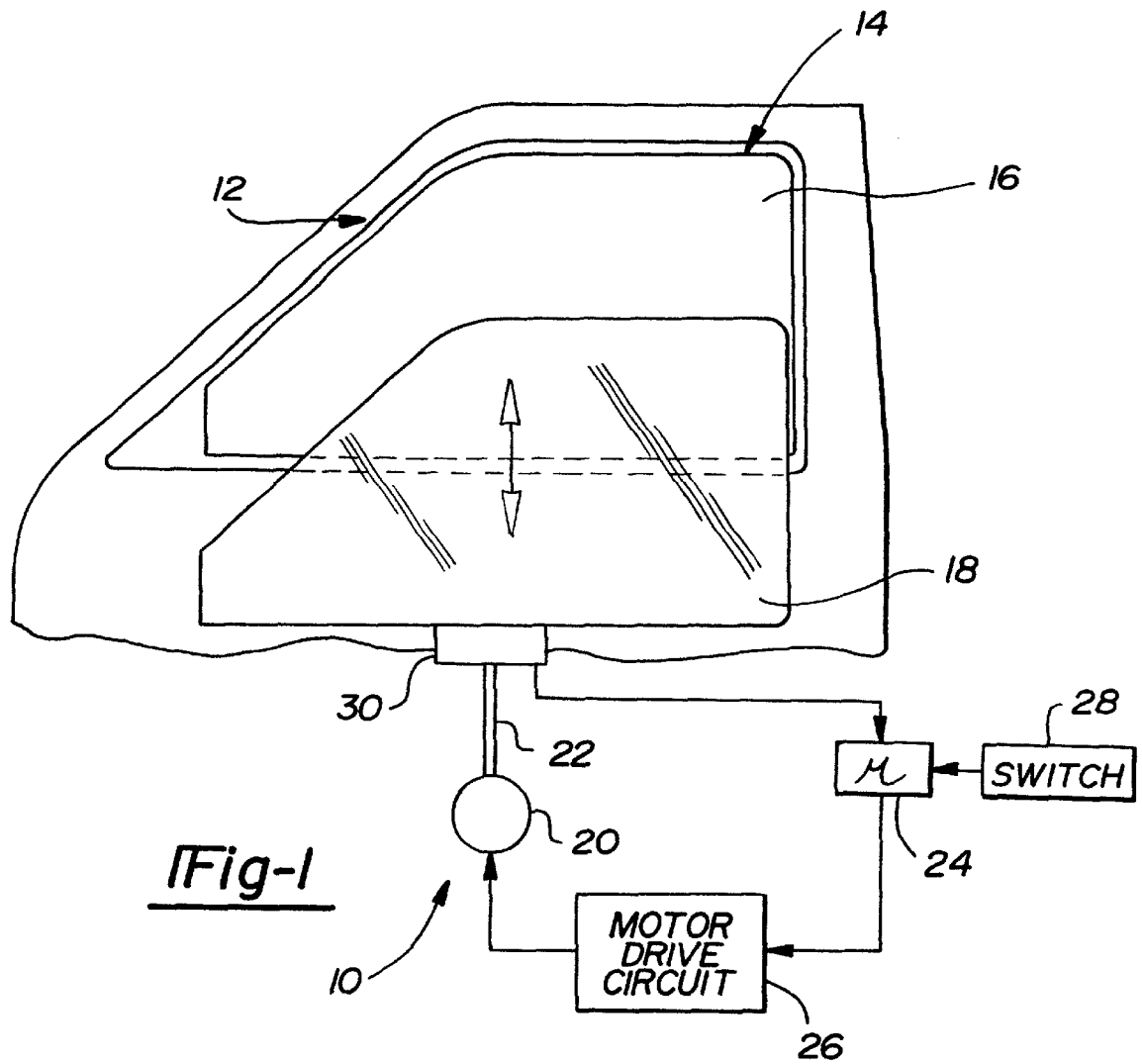
FIG. 1 is a schematic block diagram of a power window system incorporating the torque-sensing device of the present invention.

FIG. 1 shows a power window system 10 incorporating the present invention. An automotive vehicle has a door 12 and a window frame 14 defining a window opening 16. While a side window is shown, the term "window" as used in this application also extends to rear windows, moon roofs, sun roofs or other vehicle closure components.

The door 12 is equipped with a window glass 18 movable elevationally within the window opening 16 and a drive motor 20 linked with a regulator 22, shown schematically, for driving the window glass 18 upward and downward. Microprocessor, or control circuit, 24 controls the drive motor 20 via motor drive circuit 26 in response to signals from switch 28 that commands upward/downward movement of the window glass 18.

Figure 2:
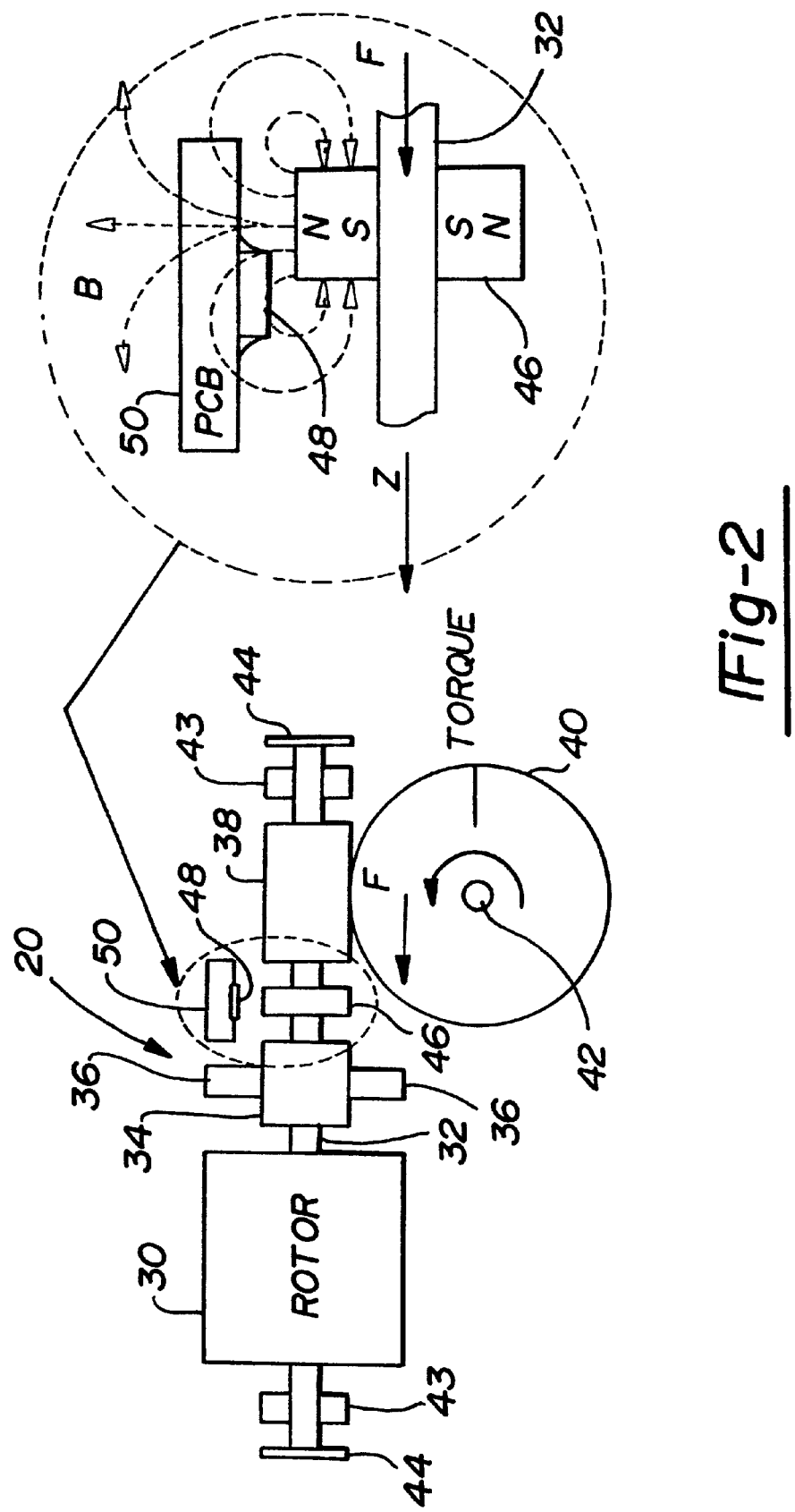
FIG. 2 is a schematic block diagram illustrating the torque-sensing device of the present invention.

Turning now to FIG. 2, there is shown a schematic block diagram of the motor 20 incorporating the torque-sensing device of the present invention. The motor 20 includes a rotor 30 that rotates about an axial rotor shaft 32. Rotor 30 is also mounted so that it can move back and forth along the axial length of the rotor shaft 32. Furthermore, motor includes commutator 34 and brushes 36.

Mounted onto or incorporated into rotor shaft 32 is a worm gear 38 having a gear wheel 40 associated therewith Output member 42 extends outward perpendicularly from gear wheel 40 and is attached to regulator 22. Thus, as rotor 30 and rotor shaft 32 rotate, worm gear 38 rotates causing gear wheel 40 to correspondingly rotate. And as gear wheel 40 rotates, the output member 42 rotates causing the regulator 22 to move upward and downward thereby closing and opening the window 18, respectively.

If there is any torque on the gear wheel 40, due to either the window 18 being pulled up or pushed down, a reaction force F is produced directed along the axis of the rotor shaft 32. The axial movement of the rotor shaft 32 is constrained by bearings 43 and spring plates 44 flexibly mounted to a housing (not shown) of the motor 20. The spring plates 44 deflect as the force is applied. Since the amount of movement, z, is a function of this force, this movement is detected utilizing a ring magnet 46 and an analog Hall Effect device 48 electrically coupled and mounted on a printed circuit board, PCB, 50. The PCB 50 is also mounted to the inside of the motor housing.

The ring magnet 46 encircles the rotor shaft 32, as shown in FIG. 2. As the rotor 30 moves along the axial length of the rotor shaft 32, the strength of the magnetic field, B, generated by the ring magnet 46 varies with the amount of displacement, z. Since the output voltage of the Hall Effect device 48 varies as a function of magnetic field, B, and displacement, z, varies as a function of torque, then the output of the Hall Effect device 48 varies as a function of the torque applied to the motor 20. This output is sensed by control circuit 24 via a connection between the control circuit 24 and the PCB 50. The control circuit 24 compares the voltage signal provided by the Hall Effect device 48 with a predetermined value determined to be reflective of an obstruction. If the predetermined value is exceeded, the control circuit 24 commands the motor 20 to either stop or reverse direction.

Figure 3:
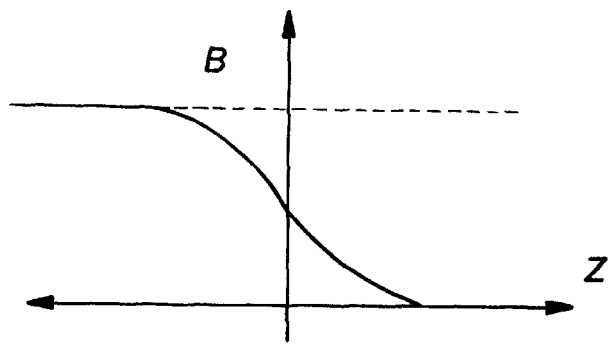
FIG. 3 is a graph illustrating how the strength of the magnetic field generated by the device of the present invention varies with displacement.

In a preferred embodiment, the placement of the ring magnet 46 is positioned on the rotor shaft 32 so that its movement along the axial length of the rotor shaft 32 is constrained with respect to the Hall Effect device 48 so that the direction of the torque can be determined That is, rather than have the ring magnet 46 positioned at the center of the Hall Effect device 48 at a steady-state or a zero-torque situation, the ring magnet 46 is positioned off-center from the Hall Effect device 48 at an end of the sensor. Thus, the direction of the torque can be determined based on the strength of the magnetic field, B, as shown in FIG. 3. An increasing magnetic field indicates a force in the left direction which corresponds to the window 18 being pushed down. On the other hand, a decreasing magnetic field indicates a force in the right direction corresponding to the window 18 being pulled up.

The device of the present invention, thus, provides a contactless method of measure motor torque. Furthermore, since electronic circuitry already exists in the motor housing, the cost of adding a magnet and modifying the plates into spring plates is incremental.

Preferred embodiments have been disclosed. However, a worker in this art would recognize that modifications would come within the scope of this invention. Thus, the following claims should be studied to determine the scope and content of this invention.

What is claimed is:

1. A method for detecting torque applied to a motor of an automotive power window system, the motor having a rotor mounted on a rotor shaft, the rotor and rotor shaft being allowed to move linearly along an axial length of the rotor shaft in response to an applied torque, the method comprising:

generating a magnetic field in response to a rotation of the rotor shaft;

sensing a strength of the magnetic field based on the linear position of the rotor shaft; and detecting a torque applied to the motor based on the strength of the magnetic field.

2. The method as recited in claim 1 wherein sensing the strength of the magnetic field further comprises generating a voltage signal proportional to the strength of the magnetic field.

3. The method as recited in claim 1 further comprising controlling the motor in response to detecting the torque.

4. The method as recited in claim 3 wherein controlling the motor includes stopping the motor.

5. The method as recited in claim 3 wherein controlling the motor includes reversing the motor.

6. The method as recited in claim 1 wherein detecting the torque further includes determining a direction of the torque based on the strength of the magnetic field and the linear position of the rotor shaft.

7. A device for driving an automotive power window system comprising:

a motor having a rotor mounted on a rotor shaft, the rotor and rotor shaft being allowed to move linearly along an axial length of the rotor shaft in response to an applied torque;

a ring magnet mounted on the rotor shaft for generating a magnetic field as the rotor shaft rotates;

a sensor in communication with the ring magnet for sensing a strength of the magnetic field based on a linear position of the ring magnet in relation to the sensor and generating a voltage signal proportional thereto; and a control circuit for receiving the voltage signal and detecting a torque applied to the motor in response thereto.

8. The device as recited in claim 7 wherein the control circuit is further operative to control the motor in response to detecting the torque.

9. The device as recited in claim 8 wherein the control circuit, in controlling the motor, is further operative to stop the motor.

10. The device as recited in claim 8 wherein the control circuit, in controlling the motor, is further operative to reverse the motor.

11. The device as recited in claim 7 wherein the control circuit is further operative to determine a direction of the torque based on the strength of the magnetic field and the linear position of the rotor shaft.

12. The device as recited in claim 11 wherein in a steady-state mode, the ring magnet is positioned at an end of the sensor rather than at a middle position of the sensor.

13. The device as recited in claim 7 wherein the sensor is a Hall Effect sensor.

* * * * *